United States Patent
Mylly

(10) Patent No.: US 10,402,106 B2
(45) Date of Patent: *Sep. 3, 2019

(54) CHANNEL OPTIMIZED STORAGE MODULES

(71) Applicant: Memory Technologies LLC, Las Vegas, NV (US)

(72) Inventor: Kimmo Juhani Mylly, Ylojarvi (FI)

(73) Assignee: Memory Technologies LLC, Kirkland, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/705,559

(22) Filed: Sep. 15, 2017

(65) Prior Publication Data

US 2018/0067665 A1    Mar. 8, 2018

Related U.S. Application Data

(63) Continuation of application No. 14/569,601, filed on Dec. 12, 2014, now Pat. No. 9,766,823.

(60) Provisional application No. 61/915,315, filed on Dec. 12, 2013.

(51) Int. Cl.
*G06F 3/06* (2006.01)

(52) U.S. Cl.
CPC ............ *G06F 3/0619* (2013.01); *G06F 3/061* (2013.01); *G06F 3/0644* (2013.01); *G06F 3/0659* (2013.01); *G06F 3/0679* (2013.01); *G06F 3/0688* (2013.01)

(58) Field of Classification Search
CPC ...... G06F 3/0619; G06F 3/061; G06F 3/0644; G06F 3/0659; G06F 3/0679; G06F 3/0688

USPC .................................................. 711/100, 103
See application file for complete search history.

(56) References Cited

U.S. PATENT DOCUMENTS

| | | |
|---|---|---|
| 3,653,001 A | 3/1972 | Ninke |
| 5,809,340 A | 9/1998 | Bertone et al. |
| 6,279,114 B1 | 8/2001 | Toombs et al. |
| 6,681,304 B1 | 1/2004 | Vogt et al. |
| 7,152,801 B2 | 12/2006 | Cuellar et al. |
| 7,409,489 B2 | 8/2008 | Sinclair |

(Continued)

OTHER PUBLICATIONS

Excerpts from Patent Owner's Proposed Construction in Related ITC Matter, "Complainant's Proposed Claim Constructions with Support", SanDisk Exhibit 1026, Patent Trial and Appeal Board, *SanDisk* v. *Memory Technologies*, U.S. Pat. No. 8,307,180, May 3, 2017, 6 pgs.

(Continued)

*Primary Examiner* — Shane D Woolwine
(74) *Attorney, Agent, or Firm* — Lee & Hayes, P.C.

(57) ABSTRACT

A storage module includes a set of memories. Each of the memories in the set of memories may be divided into a set of portions. A controller is configured to transfer data between the set of memories and a host connected through an interface. A set of channels connects the set of memories to the controller. The controller is also configured to select: a memory from the set of memories, a portion from the set of portions for the selected memory, and/or a channel from the set of channels, e.g., connected to the selected memory, based upon an identification (ID) associated with the data. The ID may be separate from the data and a write address of the data, and the selected memory, the selected portion, and the selected channel may be used to store the data.

20 Claims, 5 Drawing Sheets

(56) References Cited

U.S. PATENT DOCUMENTS

| | | | |
|---|---|---|---|
| 7,478,248 | B2 | 1/2009 | Ziv et al. |
| 8,307,180 | B2 | 11/2012 | Hyvonen et al. |
| 9,063,850 | B2 | 6/2015 | Hyvonen et al. |
| 9,367,486 | B2 | 6/2016 | Hyvonen et al. |
| 9,400,749 | B1 | 7/2016 | Kuzmin et al. |
| 2002/0087817 | A1 | 7/2002 | Tomaiuolo et al. |
| 2004/0243900 | A1 | 12/2004 | Henkel |
| 2005/0120161 | A1 | 6/2005 | Barth et al. |
| 2005/0154842 | A1 | 7/2005 | Smith et al. |
| 2006/0022054 | A1 | 2/2006 | Elhamias et al. |
| 2006/0280077 | A1 | 12/2006 | Suwa |
| 2007/0079015 | A1 | 4/2007 | Royer, Jr. et al. |
| 2008/0080688 | A1 | 4/2008 | Burgan et al. |
| 2009/0144527 | A1 | 6/2009 | Nakata et al. |
| 2011/0145537 | A1 | 6/2011 | Feldman et al. |
| 2013/0159601 | A1 | 6/2013 | Lassa et al. |
| 2013/0346671 | A1* | 12/2013 | Michael .............. G06F 12/0246 711/103 |
| 2015/0169243 | A1 | 6/2015 | Mylly | |

OTHER PUBLICATIONS

Choudhury et al., "Public Key Infrastructure Implementation and Design", SanDisk Exhibit 1022, Patent Trial and Appeal Board, *SanDisk v. Memory Technologies*, U.S. Pat. No. 8,307,180, May 3, 2017, 320 pgs.

Declaration of Stephen Gross, Before the Patent Trial and Appeal Board, *SanDisk v. Memory Technologies*, U.S. Pat. No. 8,307,180, SanDisk Exhibit 1015, May 3, 2017, 3 pgs.

Exhibit A to Second Affidavit of Christopher Butler, Patent Trial and Appeal Board, *SanDisk v .Memory Technologies*, U.S. Pat. No. 8,307,180, SanDisk Exhibit 1021, May 10, 2017, 6 pgs.

Excerpts from Patent Owner's Proposed Construction in Related ITC Matter, "Complainant's Proposed Claim Constructions with Support", SanDisk Exhibit 1026, Patent Trial and Appeal Board, *SanDisk v. Memory Technologies*, U.S. Pat. No. 8,307,180, 6 pgs.

Second Affidavit of Christopher Butler from Internet Archives, May 2017, Patent Trial and Appeal Board, *SanDisk v. Memory Technologies*, U.S. Pat. No. 9,063,850, SanDisk Exhibit 1020, 2 pgs.

Affidavit of Christopher Butler from Internet Archives, Feb. 2017, Patent Trial and Appeal Board, *SanDisk v. Memory Technologies*, U.S. Pat. No. 8,307,180, SanDisk Exhibit 1011, 8 pgs.

Assignment History for U.S. Pat. No. 6,279,114, downloaded from USPTO Website Mar. 2018, 2 pg.

Assignment History for U.S. Pat. No. 7,409,489, downloaded from USPTO Website Mar. 2018, 1 pg.

Assignment History for U.S. Pat. No. 7,478,248, downloaded from USPTO Website Mar. 2018, 1 pg.

Business Wire, "CompactFlash Association Announces Availability of Revision 3.0 of the CF+ & CompactFlash Specification; Revision 3.0 Increases CF Interface Data Transfer Rate to 66MG/sec" Jan. 2005, SanDisk Exhibit 1018, Patent Trial and Appeal Board, *SanDisk v. Memory Technologies*, U.S. Pat. No. 8,307,180, 3 pgs.

CFA, "CF+ and CompactFlash Specification, Revision 3.0", Dec. 2004, SanDisk Exhibit 1003, Patent Trial and Appeal Board, *SanDisk v. Memory Technologies*, U.S. Pat. No. 8,307,180, 186 pgs.

Choudhury et al., "Public Key Infrastructure Implementation and Design", SanDisk Exhibit 1022, Patent Trial and Appeal Board, *SanDisk v. Memory Technologies*, U.S. Pat. No. 8,307,180, 320 pgs.

"Declaration of R. Jacob Baker, Ph.D., P.E. in Support of Petition for Inter Partes Review of U.S. Pat. No. RE45,486", SanDisk Exhibit 1009, Mar. 2017, 146 pages.

Declaration of Stephen Gross, Before the Patent Trial and Appeal Board, *SanDisk v. Memory Technologies*, U.S. Pat. No. 8,307,180, SanDisk Exhibit 1015, 3 pgs.

Exhibit A to Second Affidavit of Christopher Butler, Patent Trial and Appeal Board, *SanDisk v .Memory Technologies*, U.S. Pat. No. 8,307,180, SanDisk Exhibit 1021, 6 pgs.

File History for U.S. Pat. No. 8,307,180, downloaded Mar. 2018 from USPTO Website, 4 pgs.

File History for U.S. Pat. No. 9,063,850, downloaded Mar. 2018 from USPTO Website, 4 pgs.

IBM Dictionary of Computing, Tenth Edition Aug. 1993, Definition of "Register", SanDisk Exhibit 1020, Patent Trial and Appeal Board, *SanDisk v. Memory Technologies*, U.S. Pat. No. 8,307,180, 3 pgs.

JEDEC, "MuliMediaCard Association (MMCA) and the JEDEC Solid State Technology Association (JEDEC) Announce eMMC for Embedded Flash Memory Applications", Dec. 2006, SanDisk Exhibit 1022, Patent Trial and Appeal Board, *SanDisk v. Memory Technologies*, U.S. Pat. No. 9,063,850, 4 pgs.

McGraw-Hill Electronics Dictionary, Sixth Edition 1997, Definition of "Register", SanDisk Exhibit 1013, Patent Trial and Appeal Board, *SanDisk v. Memory Technologies*, U.S. Pat. No. 8,307,180, 3 pgs.

"The MultiMediaCard", System Specification, Version 3.31, MMCA Technical Committee, SanDisk Exhibit 1009, Patent Trial and Appeal Board, *SanDisk v. Memory Technologies*, U.S. Pat. No. 8,307,180, 150 pgs.

Horak, Webster's New World Telecom Dictionary Copyright 2008, Definition of "Register", SanDisk Exhibit 1027, Patent Trial and Appeal Board, *SanDisk v. Memory Technologies*, U.S. Pat. No. 8,307,180, 4 pgs.

Office action for U.S. Appl. No. 14/569,601, dated Jan. 23, 2017, Mylly, "Channel Optimized Storage Modules", 78 pages.

Office action for U.S. Appl. No. 14/569,601, dated Sep. 8, 2016, Mylly, "Channel Optimized Storage Modules", 66 pages.

The PCT Search Report and Written Opinion dated Mar. 23, 2015 for PCT application No. PCT/US2014/070177, 11 pages.

Affidavit of Chistopher Butler, dated Jan. 18, 2019, Internet Archives, Kingston Exhibit 1023, *Kingston Technology Co. v. Memory Technologies Petition* for Inter Partes Review, 2 pgs.

Declaration of Michael Asao, dated Jan. 24, 2019, Kingston Exhibit 1025, *Kingston Technology Co. v. Memory Technologies Petition* for Inter Partes Review, 4 pgs.

Declaration of R. Jacob Baker dated Jan. 29, 2019, Kingston Exibit 1002, *Kingston Technology Co. v. Memory Technologies Petition* for Inter Partes Review, 236 pgs.

Exhibit A to Affidavit of Chistopher Butler, dated Jan. 18, 2019, Kingston Exhibit 1024, *Kingston Technology Co. v. Memory Technologies Petition* for Inter Partes Review, 15 pgs.

Prosecution history for U.S. Pat. No. 8,307,180, Exhibit 1009, *Kingston Technology Co. v. Memory Technologies Petition* for Inter Partes Review dated Jan. 30, 2019, 597 pages.

Prosecution history for U.S. Pat. No. 9,063,850, Exhibit 1012, *Kingston Technology Co. v. Memory Technologies Petition* for Inter Partes Review dated Jan. 30, 2019, 659 pages.

Prosecution history for U.S. Pat. No. 9,367,486, Exhibit 1009, *Kingston Technology Co. v. Memory Technologies Petition* for Inter Partes Review dated Jan. 30, 2019, 286 pages.

Excerpts of Apr. 17, 2017 Third Joint Claim Construction and Prehearing Statement (N.D. Cal. Patent L.R. 4-3) filed in related matter on Nov. 16, 2018, Kingston Exhibit 1022, *Kingston Technology Co. v. Memory Technologies Petition* for Inter Partes Review, 6 pgs.

* cited by examiner

CHANNEL OPTIMIZED STORAGE MODULES

CROSS REFERENCE TO RELATED APPLICATIONS

This is a continuation application which claims priority to commonly assigned, co-pending U.S. patent application Ser. No. 14/569,601, filed Dec. 12, 2014, which claims priority to U.S. Provisional Application No. 61/915,315, filed Dec. 12, 2013, and entitled "Channel Optimized Storage Modules". Application Ser. Nos. 14/569,601 and 61/915,315 are fully incorporated herein by reference.

This application is related to U.S. application Ser. No. 12/455,763, filed Jun. 4, 2009, now patented as U.S. Pat. No. 8,874,824, U.S. application Ser. No. 11/176,669, filed Jul. 8, 2005, now patented as U.S. Pat. No. 7,827,370, and U.S. application Ser. No. 13/179,689, filed Jul. 11, 2011, now patented as U.S. Pat. No. 8,560,778, each of which are assigned to the assignee of the present application. Each of these related applications are incorporated herein by reference in their entireties.

BACKGROUND

Managed storage modules, such as managed NAND storage modules, provide many benefits over using raw memories such as flash NAND memories. Managed storage modules, which typically include a storage controller combined with NAND memory in the case of managed NAND or other types of memory in other cases, provide several benefits to device manufacturers. The storage controller hides the details of the memory (e.g., NAND) and provides the intended interface and other features, such as error-correcting code (ECC) support without the device manufacturers having to implement those features on the host side (e.g., a smartphone or a tablet, an SoC). Additionally, managed storage modules allow new advanced features to be implemented in the storage controller without the host necessarily having to be aware that the features exist. The advanced features may either be activated or not by the storage controller depending on whether the host supports the features. Thus, managed storage modules improve backwards compatibility.

Examples of managed storage modules (e.g., managed storage devices), and in particular managed NAND storage modules, include embedded multimedia cards (eMMC), Universal Flash Storage (UFS), solid-state drive (SSD) modules. These modules are used in wide variety of applications like mobile phones, Global positioning system (GPS) devices, media players, PCs, and servers for storing the operating system code, applications, and user data, such as, photos and videos. Along with the data visible to the host device, operational code/firmware (FW) of the storage module itself is stored in the memory of the storage module. Additionally, other important data, which is used to operate the memory module, such as register data and address translation data, may be stored in the memory.

The increase of interface bandwidth and introduction of caching has improved the sequential read/write and random write performance of a managed storage module. Queuing commands may also improve the random read performance. However, this depends on a capability of the system to efficiently queue commands and, to some extent, a capability to predict how the storage will be accessed in the future. U.S. Pat. No. 8,560,778, filed Jul. 11, 2011, introduces some methods for informing the storage module to pre-fetch data before a new command is received. The content of this patent is incorporated herein in its entirety.

SUMMARY

Embodiments of the present disclosure include a storage module including a set of memories including at least one memory, wherein each of the memories in the set of memories includes a plurality of memory circuits for storing data and is divided into a set of portions, each set of portions including at least one portion. The storage module also includes a controller configured to transfer data between the set of memories and a host connected through an interface. The storage module also includes a set of channels connecting the set of memories to the controller, wherein the set of channels includes at least one channel and each of the channels in the set of channels connects the memory controller to at least one of the memories in the set of memories. The controller is configured to select a first memory from the set of memories, a portion from the set of portions for the first memory, or a first channel from the set of channels connected to the first memory based upon an ID associated with the data, wherein the ID is separate from the data and the write address of the data, and wherein the first memory, the first portion, and the first channel are used to store the data.

Embodiments of the present disclosure include a storage module comprising a set of memories including at least one memory, wherein each of the memories in the set of memories includes a plurality of memory circuits for storing data and is divided into a set of portions, each set of portions including at least one portion. A controller is configured to transfer the data between the set of memories and a host through an interface. A set of channels connects the set of memories to the controller, wherein the set of channels includes at least one channel and each of the channels in the set of channels connects the controller to at least one of the memories in the set of memories. The controller is further configured to select at least one of (1) a memory area from the set of memories or (2) a channel from the set of channels, based at least in part upon an ID associated with the data. The at least one of the selected memory area or the selected channel are used to store the data.

In some embodiments, the selected memory area comprises a selected memory from the set of memories. In some embodiments, the controller is further configured to select a portion from the set of portions of the selected memory.

In some embodiments, the selected memory area comprises a selected portion from the set of portions of a memory of the set of memories.

In some embodiments, the set of memories is a set of non-volatile memories.

In some embodiments, the set of memories is one of NAND, eMMC, UFS, SD card or SSD memory.

In some embodiments, the set of memories includes a first memory and a second memory.

In some embodiments, the set of portions for each memory in the set of memories includes a first portion and a second portion.

In some embodiments, the set of channels includes a first channel and a second channel.

In some embodiments, each of the memories in the set of memories is a memory chip.

In some embodiments, each of the portions in the set of portions is a plane of a memory.

In some embodiments, the controller is further configured to write data with a same ID using a same memory, portion, and channel.

In some embodiments, the controller is further configured to extract the ID prior to receiving the data.

In some embodiments, the controller is further configured to extract the ID as part of decoding a write or read command for the data.

In some embodiments, a storage device may further comprise at least one register containing a number of parallel accesses supported by the storage device, wherein a number of distinct IDs supported by the controller is a same number as the number of parallel accesses supported by the storage device.

In some embodiments, a storage device may further comprise at least one register containing at least one of an indication of a width of channels in the set of channels, an indication of a number of channels in the set of channels, an indication of a number of memory chips in the set of memories, a number of memory chips per channel, or a number of planes implemented in an individual memory chip.

In some embodiments, a first memory is selected by the controller and a first channel and a first portion are used as a default.

In some embodiments, a first portion is selected by the controller and a first memory and a first channel are used as a default.

Embodiments of the present disclosure include a method comprising receiving data to be stored in a storage device. The storage device comprises a set of memories including at least one memory, wherein each of the memories in the set of memories includes a plurality of memory circuits for storing data and is divided into a set of portions, each set of portions including at least one portion. The storage device comprises a set of channels connecting the set of memories to the controller, wherein the set of channels includes at least one channel and each of the channels in the set of channels connects a controller of the storage device to at least one of the memories in the set of memories. The method further comprises receiving an ID associated with the data to be stored in the storage device, selecting, by the storage device and based at least in part upon the ID associated with the data, at least one of (1) a memory area from the set of memories or (2) a channel from the set of channels, and utilizing, by the storage device, the at least one of the selected memory area or the selected channel to store the data.

Embodiments of the present disclosure include a storage device comprising means for receiving data to be stored in the storage device and an ID associated with the data to be stored in the storage device. The storage device also comprises means for controlling the storage device. The storage device comprises a set of memories including at least one memory, wherein each of the memories in the set of memories includes a plurality of memory circuits for storing data and is divided into a set of portions, each set of portions including at least one portion. The storage device comprises a set of channels connecting the set of memories to the means for controlling the storage device, wherein the set of channels includes at least one channel and each of the channels in the set of channels connects the means for controlling the storage device to at least one of the memories in the set of memories. The means for controlling the storage device selects, based at least in part upon the ID associated with the data, at least one of (1) a memory area from the set of memories or (2) a channel from the set of channels and utilizes the at least one of the selected memory area or the selected channel to store the data.

Embodiments of the present disclosure include a host device including an interface configured to couple the host device to a storage device. The storage device includes a set of memories including at least one memory, wherein each of the memories in the set of memories includes a plurality of memory circuits for storing data and is divided into a set of portions, each set of portions including at least one portion. The storage device includes a set of channels connecting the set of memories to the controller, wherein the set of channels includes at least one channel and each of the channels in the set of channels connects a controller of the storage device to at least one of the memories in the set of memories. The host device also includes a host controller configured to detect a number of possible parallel read accesses associated with data to be stored in the storage device, determine, based on the number of possible parallel read accesses associated with the data, an ID associated with the data; and transmit, to the storage device, the ID associated with the data.

In some embodiments, the host controller is configured to detect the number of possible parallel read accesses associated with the data by at least reading an indication of the number of possible parallel read accesses associated with the data from a register of the storage device.

In some embodiments, the host controller is configured to detect the number of possible parallel read accesses associated with the data by at least receiving an indication of the number of possible parallel read accesses associated with the data from the storage device.

Figure 1:
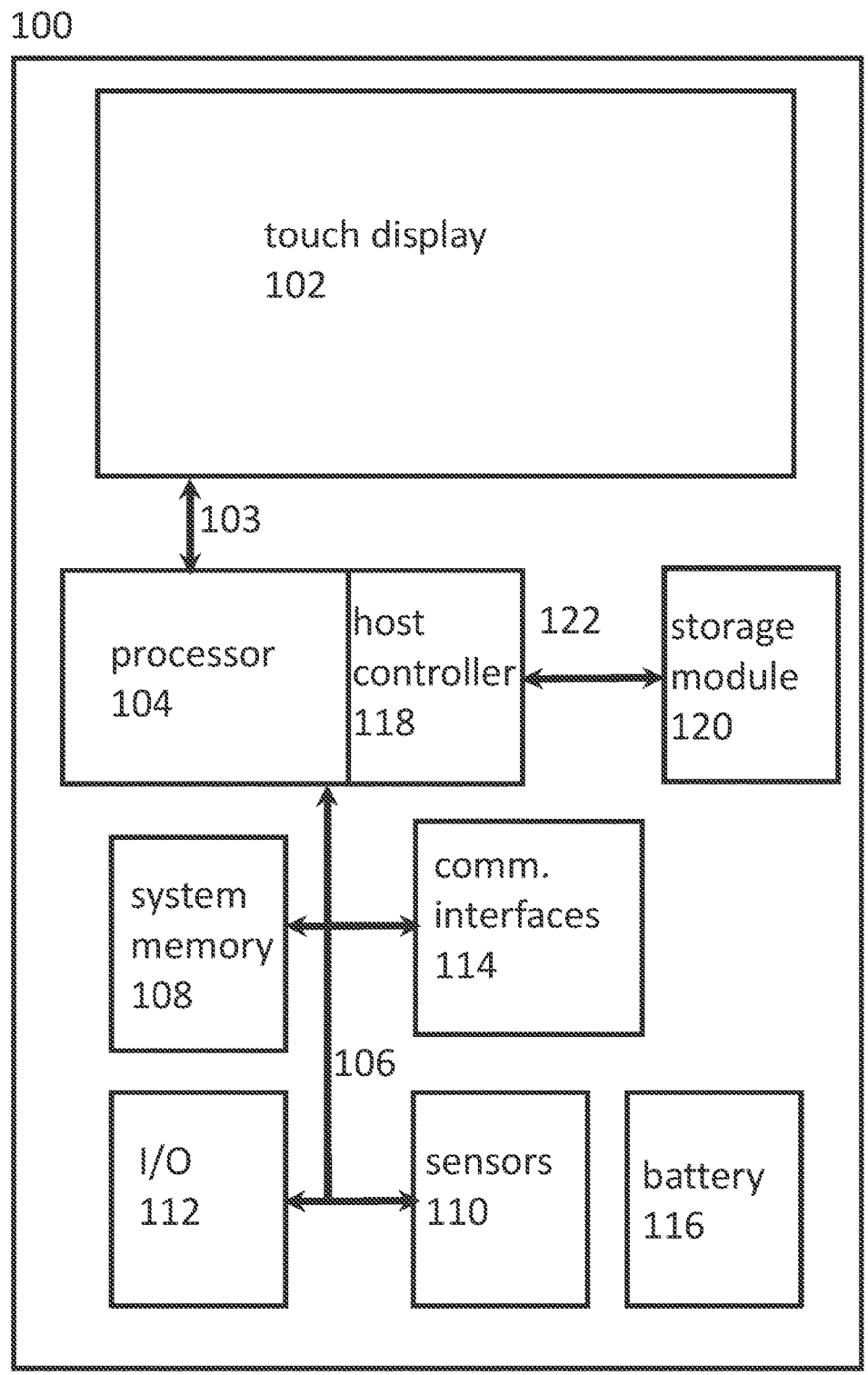
FIG. 1 depicts an example host device.

The figures depict embodiments of the present disclosure for purposes of illustration only. One skilled in the art will readily recognize from the following discussion that alternative embodiments of the structures and methods illustrated herein may be employed without departing from embodiments described herein.

DETAILED DESCRIPTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the scope consistent with the claims.

A managed storage module's random read performance may be improved by command queuing. For example, if several commands are be queued together, then the managed storage module may determine which of the commands to immediately execute and which commands may need to wait for other commands to finish. In other words, command queuing allows for efficient use of the hardware resources of the managed storage module by ensuring that a maximum number of commands possible is always being executed simultaneously.

However, in some cases, adding command queuing may not improve performance because all of the commands in the queue may require access to the same hardware resources (e.g., the commands are all accessing the same block of memory). To minimize the chance of this happening, data stored on the storage module may be organized as efficiently as possible. Various different types of access patterns may occur while accessing a storage module (e.g., a relatively short 4 kB random access followed by a relatively long 1 MB sequential access, a relatively long 1 MB sequential access followed by a relatively short 4 kB random access, etc.). Unless a storage module is aware of how data is going to be accessed in the future, there is little that the storage module can do to properly organize the data to make command queuing effective.

One possible method to improve the organization of the data is to inform the managed storage module about how data may be accessed in the future when first writing the data to the managed storage module. For example, if two streams of data are each marked as different streams and as being likely accessed in parallel in the future, then the managed storage module may store the two streams of data in such a manner as to improve the chance that command queuing is effective. For instance, the managed storage module may store the two data streams in a manner that minimizes the commonality of resources (e.g., memory chips, planes, or channels) that are used to access each data stream. Some of the embodiments of the present disclosure discussed below implement these types of features.

A method is introduced to maximize the parallelism inside a memory module, particularly related to future coming reads. By informing the memory module about predicted parallel accessed streams the memory module may better arrange the data favorably for parallel accessed streams.

FIG. 1 depicts an example host 100, e.g., a host device such as a smartphone device or a tablet device, that may utilize embodiments of the present disclosure. Host 100 includes a touch display 102 that is sensitive to a user's touch based on capacitive or resistive detection. Bus 103 connects touch display 102 to processor 104, which may include a graphics subsystem that handles the display of graphics and text on touch display 102. Host 100 also includes a number of other components connected to processor 104 through shared bus 106, including system memory 108 (e.g., DRAM), sensors 110 (e.g., accelerometers, gyroscope, GPS), input/output (I/O) 112 (e.g., a speaker, a microphone, or a keyboard), and communications interfaces 114 (e.g., USB, WiFi, Bluetooth, or other wired or wireless interfaces). Processor 104 may also include host controller 118 (which may be alternatively connected to but is separate from processor 104) that interfaces with storage module 120 over bus 122. Storage modules according to embodiments, including storage module 120, include one or more storage devices. Alternatively, host controller 118 may interface with storage module 120 over shared bus 106. Both shared bus 106 and bus 122 may include several bus lines for data, commands, clocking signals, power, reset, etc. An example of the bus lines included in bus 122 is described below with respect to FIG. 2. Battery 116 provides power to above described components through a power supply bus and/or lines (not shown).

While the use of storage module 120 is shown in the context of a touch sensitive smartphone or tablet, the present disclosure is not limited to use in such devices. Embodiments of the present disclosure may be applied to any electronic device that utilizes storage, e.g., wearable computers such as smartwatches or glasses, televisions, cameras, netbooks, gaming consoles, personal computers, servers, set top boxes, and the like. Additionally, the architecture of host 100 is provided for illustrative purposes only and should not be considered limiting.

Figure 2:
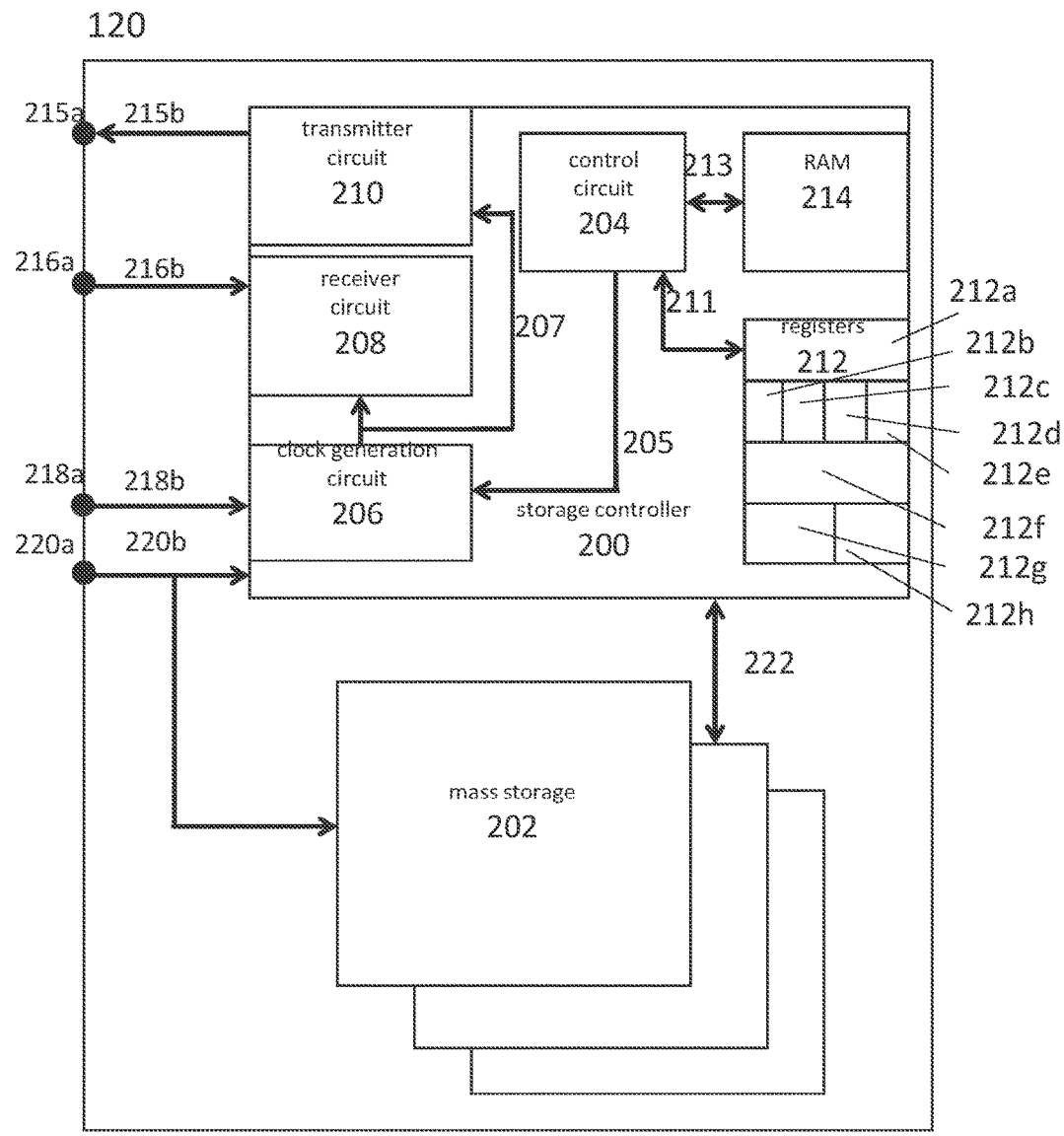
FIG. 2 depicts an embodiment of a storage module.

FIG. 2 depicts an exemplary architecture for storage module 120 that may implement embodiments of the present disclosure. Storage module 120 may be a memory storage device contained within a package (e.g. a ball grid array (BGA) package) that is designed to be mounted on a printed circuit board. For example, storage module 120 may be an embedded multimedia card (eMMC) or a Universal Flash Storage (UFS) module. Alternatively, storage module 120 may be a memory storage device contained within a removable card that fits within a slot on the host 100 or a semi-removable device such as an SSD module or PC/server cards/modules (e.g., PCIe cards). Additionally, although storage module 120 is shown as being one self-contained storage device, storage module 120 may also be implemented with a collection of interconnected devices.

As shown in FIG. 2, storage module 120 includes storage controller 200 for communicating data between mass storage 202 and host 100 (see FIG. 1). Storage controller 200 includes control circuit 204 for controlling the operation of storage controller 200. Control circuit 204 may be connected to RAM 214 over bus 213 for storing operating information and/or for temporary storage. Storage controller 200 also includes clock generation circuit 206 for generating an internal clocking signal on internal clock line 207, receiver circuit 208 for receiving data and commands from host controller 118 (see FIG. 1), transmitter circuit 210 for transmitting data and status information to host controller 118 (see FIG. 1), and registers 212 for storing information and settings relating to the operation of storage module 120, including information related to the generation of the internal clocking. Control circuit 204 may use bus 211 to access or write information to registers 212. Storage module 120 communicates with host controller 118 through data out line 215b and data terminal 215a, which may provide data and status information, and data in line 216b and data terminal 216a, which may provide data, commands, and status information.

Storage module 120 also includes reference clock line 218b and reference clock terminal 218a that provide a reference clock signal to clock generating circuit 206, and power line 220b and power terminal 220a that provide power to storage controller 200 and mass storage 202. While the above lines and terminals are shown to be single lines and terminals in FIG. 2, each line and terminal may be made up of multiple lines and terminals. For example, power terminal 220a may include multiple terminals associated with multiple lines of power line 220b that each individually provide power to the different components (e.g., mass storage 202 and storage controller 200). As another example, data out line 215b and data out terminal 215a or data in line 216b and data in terminal 216a may be implemented using two lines (e.g., a differential pair or a 2-bit wide bus) connected to two terminals. Bus 222 allows for storage controller 200 to read data from and write data to mass storage 202.

Storage module 120 also includes mass storage 202, which includes one or more memory blocks on one or more memory planes/banks, which may be on one or more chips having memory circuits or cells for storing one or more bits of information. For example, mass storage 202 may be implemented with a non-volatile memory such as NAND flash memory having memory cells/circuits (e.g., NAND cells) each capable of storing one bit (single-level cell) or multiple bits (multi-level cell) of data. Other forms of non-volatile memory may also be used without departing from the present disclosure. Mass storage 202 may be physically and/or logically divided. For example, mass storage 202 may be implemented as a single chip. Alternatively, mass storage 202 may be implemented with several discrete chips that are connected together in a single package (as shown in FIG. 2) or, alternatively, separately packaged and externally connected together. In some examples, mass storage 202 may also be divided up into planes, banks, blocks, and/or pages. Storage controller 200 is connected to mass storage 202 through bus 222, which allows for storage controller 200 to read data from, and write data to, mass storage 202.

RAM 214 is present in some embodiments of the present disclosure; the storage controller 200 may use RAM 214 to store operating information (e.g., operating code and/or state information). For example, RAM 214 may store a translation table that describes how logical addresses are mapped to physical addresses of mass storage 202. When RAM 214 is not implemented within storage module 120 or is only implemented with limited size within storage module 120, in some cases, storage controller 200 may request and use a portion of system memory 108 of host 100 (see FIG. 1) in place of RAM 214 or together with any implemented RAM 214, as described in U.S. patent application Ser. No. 12/455,763, filed Jun. 4, 2009, which is incorporated by reference in its entirety.

Clock generation circuit 206 may be implemented with a circuit that is capable of generating a clock signal. For example, clock generation circuit 206 may be implemented using common clock recovery and/or generation circuits including PLLs, oscillators, voltage controlled oscillators, delay locked loops, frequency detectors, frequency multipliers/dividers, phase detectors, combinations of these circuits, or any other suitable circuit. Clock generation circuit 206 may also rely on other components, such as resistors, capacitors, inductors, crystals, or MEMS devices. Clock generation circuit 206 may also be programmable so that it may provide a clocking signal output that varies according to the inputs that it receives. For example, clock generation circuit 206 may be configured to produce a clocking signal of a very high quality (e.g., low jitter) when a reference clock signal is present on reference clock line 218b. Clock generation circuit 206 may also be configured to produce a clocking signal of a lower quality when a reference clock signal is absent. As other examples, the frequency, duty cycle, jitter, output skew, or propagation delay of the outputted clocking signal may be set according to inputs (e.g., control bits) that are provided to clock generation circuit 206 through bus 205. In alternative architectures, clock generation circuit 206 have directly access registers 212 without going through control circuit 204; in still other embodiments clock generation circuit 206 may have a register internal to itself for storing clock configuration information. While clock generation circuit 206 is shown to be part of storage controller 200, clock generation circuit 206 may also be implemented external to storage controller 200 without departing from the present disclosure.

Receiver circuit 208 and transmitter circuit 210 receive the internal clock signal on internal clock line 207 so that storage module 120 may transfer data to host 100 at higher rates than without a clock signal. In another embodiment, internal clock line 207 provides the internal clock signal to the receiver circuit 208, but not to the transmitter circuit 210. In yet another embodiment, internal clock line 207 provides the internal clock signal to the transmitter circuit 210, but not to the receiver circuit 208.

Registers 212 store one or more bits of information regarding the operation of storage module 120, including information regarding the operation of clock generation circuit 206 or other features of storage module 120. Registers 212 may be implemented as part of storage controller 200, as part of mass storage 202, as part of RAM 214, or as part of some other memory circuit in storage module 120. The memory used for registers 212 may be any type. For example, registers 212 may be implemented in volatile memory (e.g., SRAM, DRAM, or other volatile memory), non-volatile memory (e.g., flash memory, magnetic memory, resistive memory, or other non-volatile memory), read-only memory (ROM), one time programmable memory, or any combination of these or other types of memory.

Registers 212 may include several individual registers, e.g., registers 212a-212h of similar or different sizes. For example, register 212a may be a 1-byte register while registers 212b-212e are 1-bit registers and register 212f is a 4-byte register. Registers 212 may be used to store several specific types of information. In one case, some of registers 212 store read-only information that describes how storage module 120 operates (e.g., supported features) or configuration for storage module 120 to properly operate or operate at different levels of performance (e.g., configurations for different transfer rates). In another case, some of registers 212 store writeable information that configures how storage module 120 operates or what specifications storage module 120 uses to operate. In yet another case, some of registers 212 store information about how storage module 120 is currently operating or the current state of storage module 120. Together, registers 212 may also store all of the different types of information described above along with other types of data. Registers 212 may also be used to implement descriptors, flags, and attributes as described in JEDEC Standard No. 220A for Universal Flash Storage (UFS 1.1), published June 2012, which is incorporated by reference herein in its entirety.

In one case, registers 212 store information that describes a region of mass storage 202 that is write protected (either permanently or temporarily). For example, register 212f may define an address range, a block range, a partition, or the like that defines the region. Another register, e.g. register 212g, may define whether the region is permanently, temporarily, or authenticated write protected. In the case of permanent or temporary, the region is protected as described in U.S. Pat. No. 7,827,370, which is incorporated by reference in its entirety. However, in the case of the region being authenticated write protected, the region may be written/programmed to if authentication of the data to be written is successful. Implementation of this feature is discussed below with respect to various embodiments of the present disclosure.

In another case, registers 212 may store information that describes the hardware resources available in storage module 120. For example, registers 212 may store an indication of a width of channels in bus 222 or a number of channels in bus 222. Similarly, registers 212 may also store an indication of a number of memory chips in mass storage 202, a number of memory chips per channel, and/or a number of planes implemented in an individual memory chip. Examples of a number (1-N) of channels in bus 222, a number (1-N) of memory chips in mass storage 202, a number (1-N) of memory chips associated with a channel, and/or a number (1-N) of planes per memory chip, are further discussed below with respect to FIGS. 3 and 4. Registers 212 may also store an indication of how many parallel data streams may be read or written at once. This may be defined separately for different type of accesses and/or combination of accesses (e.g., separately defined for read accesses and write accesses).

Control circuit 204 may include a state machine or several state machines. In some embodiments, control circuit 204 may include a general purpose processor or microcontroller that is programmed to control storage module 120. For example, a processor programmed with firmware may implement one or more state machines that govern the operation of storage module 120. Firmware or other software for programming control circuit 204 may be stored in dedicated storage or in a reserved storage part on mass storage 202. As another alternative, control circuit 204 may be implemented as a combination of a general purpose processor programmed with firmware or the like and special purpose circuitry that performs specific functions.

Among the aspects of storage module 120 that control circuit 204 controls is the operation of clock generation circuit 206. In particular, using information stored in registers 212 and state information, which, in some examples, may also be stored in registers 212 or alternatively in RAM 214, control circuit 204 supplies control information (e.g., control bits) to clock generation circuit that controls the operation of the internal clock signal.

Other functions of control circuit 204 include receiving command signals from host 100 to perform certain functions. For example, control circuit 204 may receive command signals from host 100 to read information from, or write information to, registers 212. For instance, control circuit 204 may receive a command to read registers 212 in a location that stores a state of storage module 120 (e.g., a power state, a programming state, etc.).

It should be understood that the architecture of FIG. 2 is an example for ease of discussion only and should not be considered limiting on the disclosure. Circuits, buses, lines, modules and the like may have been simplified, left out, or otherwise combined with other components in FIG. 2. For example, storage module 120 is shown to have buses, such as internal clock line 207, bus 205, bus 213, bus 211, and bus 222; these buses may be removed, combined, rerouted, and/or added to without departing from the embodiments described herein. As another example, the functionality of control circuit 204 may be greatly expanded over what is described above and/or the functions described above by control circuit 204 may be spread across different circuits.

Figure 3:
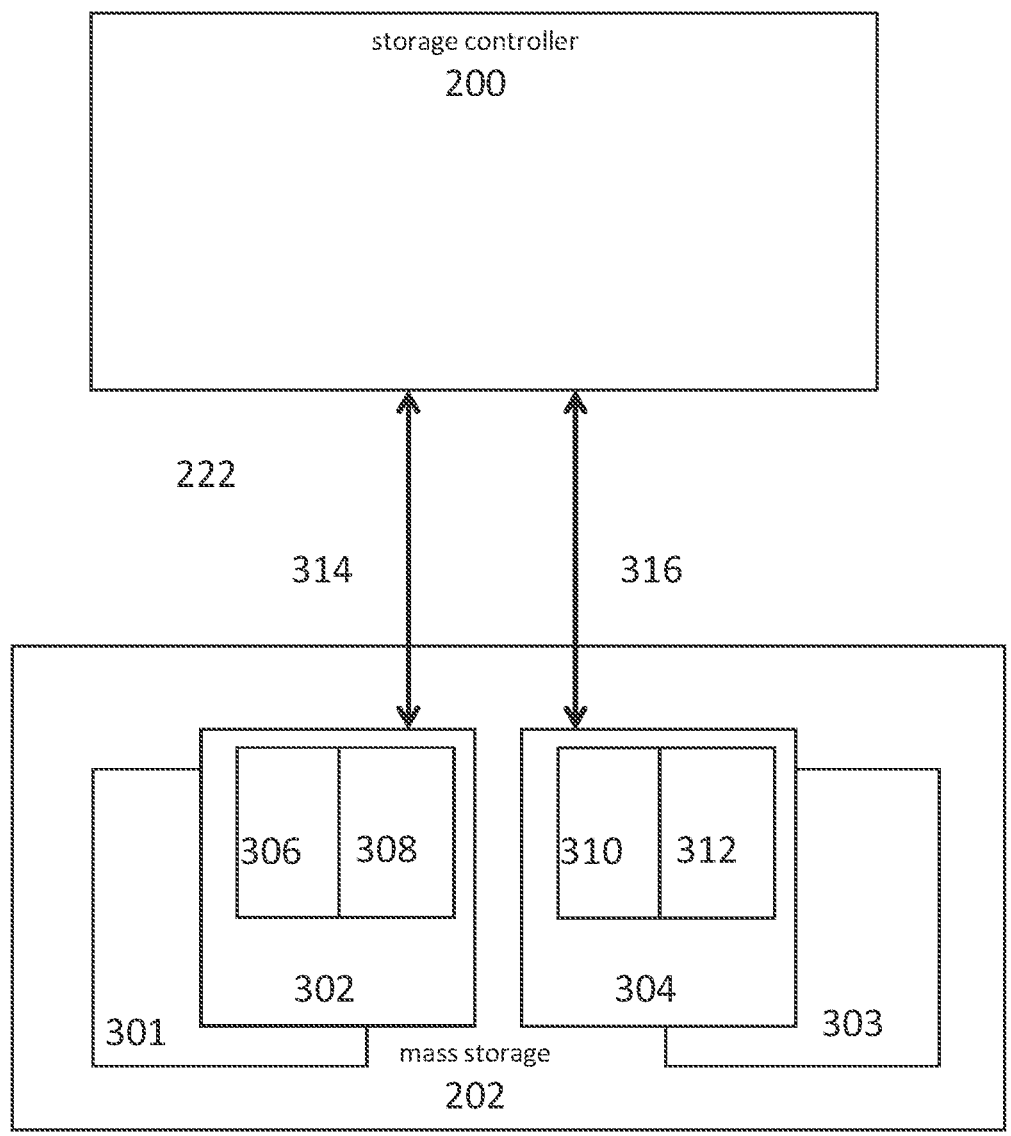
FIG. 3 depicts an embodiment of the storage module illustrating additional detail associated with a mass storage.

FIG. 3 depicts additional example details of mass storage 202 and its connection to storage controller 200 through bus 222. In particular, mass storage 202 may be made up of a set of memories, e.g., chips 301-304 (e.g., NAND memory chips). Each memory chip may be further divided into a set of portions. For example, memory chip 302 may be organized into two portions, e.g., plane 306 and plane 308. Similarly, memory chip 304 may be organized into two portions, e.g., plane 310 and 312. While not shown in FIG. 3, memory chips 301 and 303 may be similarly organized. Each portion (e.g., plane) of memory chips 301-304 may contain a certain number of blocks. For example, plane 306 may contain the odd numbered blocks of memory chip 302 and plane 308 may contain the even numbered blocks of memory chip 302. Each block then may contain a number of pages of memory. Each page may contain a number of bits of memory. The two-plane architecture, e.g., for a memory chip, allows for simultaneous reads from, and/or writes to, two pages or the concurrent erasing of two blocks. While blocks and pages are being used to describe the physical organization of memory chips 301-304, these terms may also be used to describe logical organization of memory in other contexts.

Bus 222 may include a set of channels, e.g., channel 314 and channel 316. Each channel provides a connection between storage controller 200 and a memory (e.g., a memory chip or set of chips) of mass storage 202. In particular, channel 314 provides communication (e.g., data transmission) between storage controller 200 and memory chips 301 and 302. Channel 316 provides the communication between storage controller 200 and memory chips 303 and 304. The example dual-channel architecture of mass storage 202 allows for higher throughput between storage controller 200 and mass storage 202.

Figure 4:
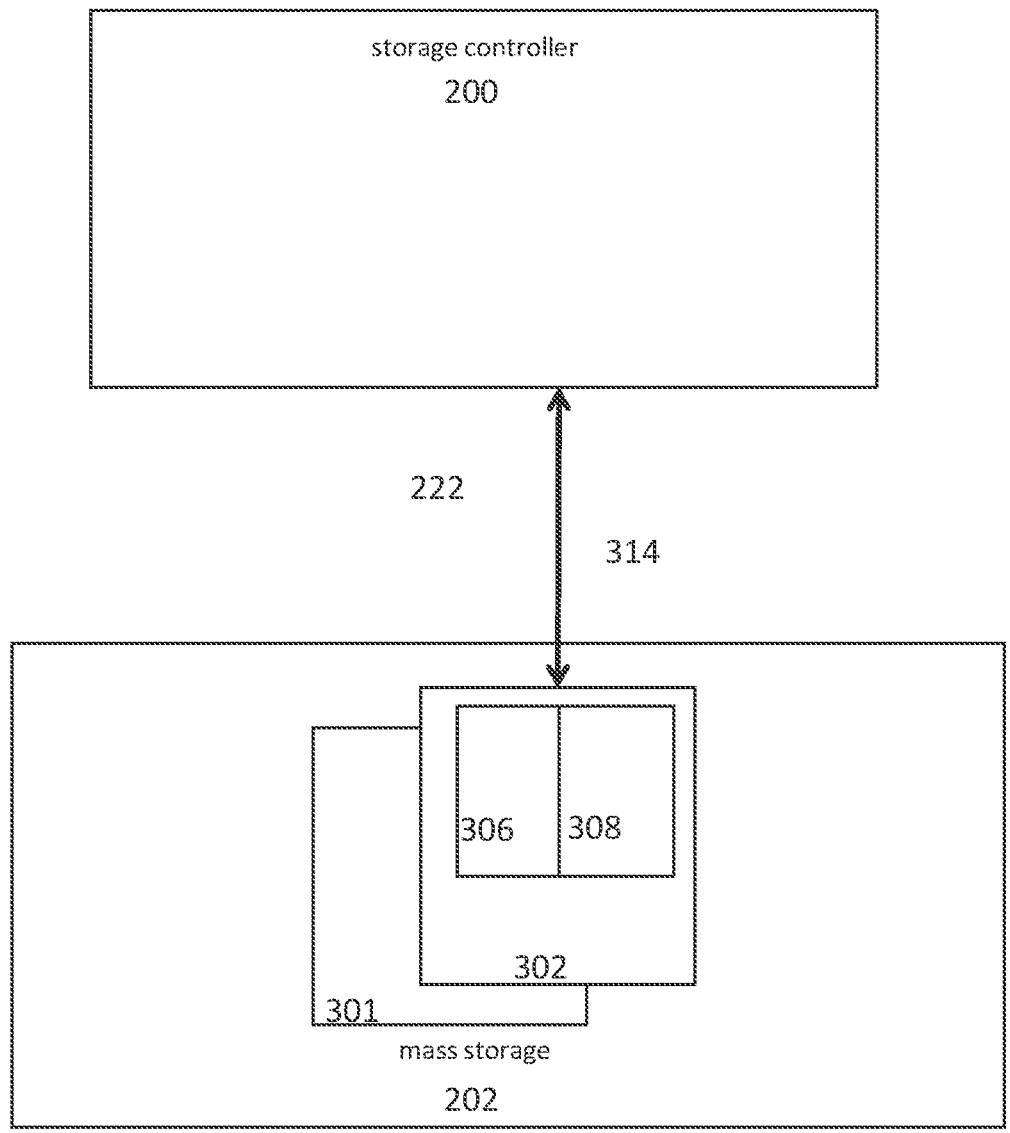
FIG. 4 depicts an alternative embodiment of the storage module illustrating additional detail associated with a mass storage.

Other variations are possible of the hardware layout of mass storage 202 depicted in FIG. 3. For example, FIG. 4 depicts a mass storage 202 that has two memory chips 301 and 302 (not four as in FIG. 3), where memory chip 302 may be organized into two portions, e.g., plane 306 and plane 308 as previously described. Also, mass storage 202 connects to storage controller 200 through bus 222 which has one channel 314 (not two as in FIG. 3). The architectures shown in FIGS. 3 and 4 are for example purposes. The number of channels, number of memory chips in the mass storage 202, the number of memory chips connected to each channel, the number of planes per memory chip, etc., may vary without departing from embodiments of the present disclosure.

Other examples of possible hardware layouts of mass storage 202 may include: a set of two memory chips connected to the storage controller 200 by one channel and each memory chip having one plane; a set of four memory chips connected to the storage controller 200 by a set of two channels (e.g., each channel connecting two memory chips to the storage controller 200) and each memory chip have a set of four planes; and one memory chip connected to the storage controller 200 by one channel and the memory chip having a set of two planes.

Figure 5:
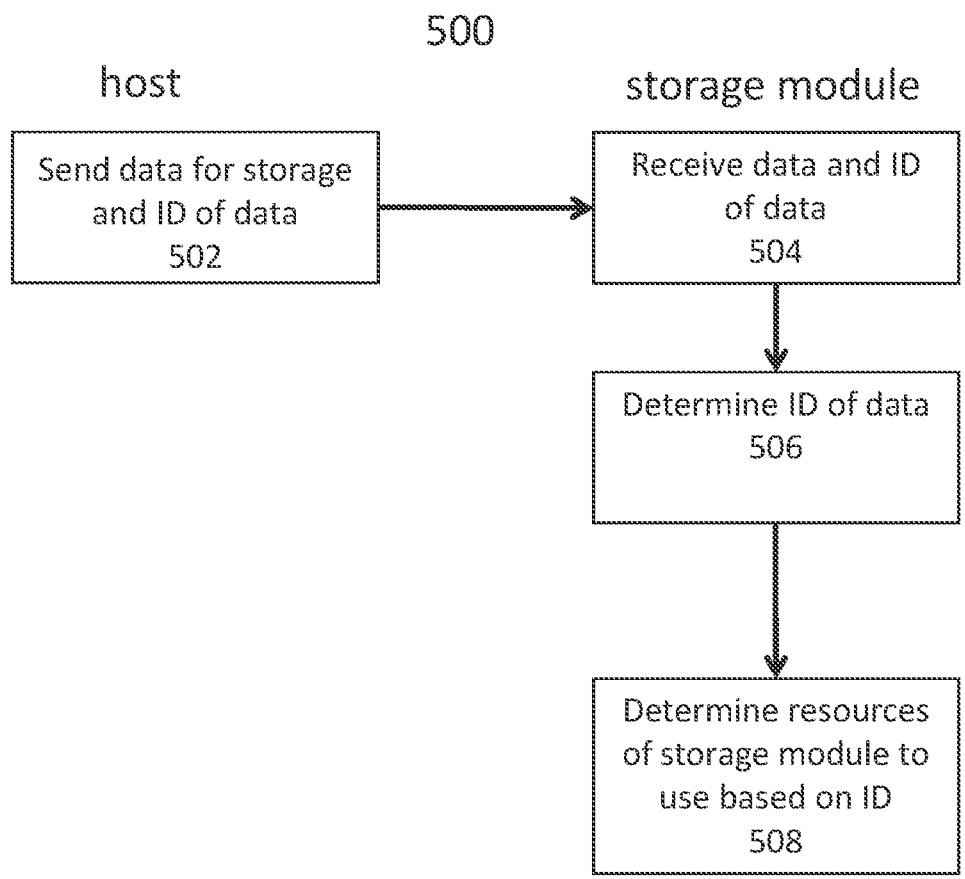
FIG. 5 depicts a process flow of a first embodiment of the present disclosure.

FIG. 5 depicts exemplary process 500 that implements a first embodiment of the present disclosure. Storage module 120 may implement the storage module portion of process 500, which itself is an embodiment of the present disclosure.

In step 502, host 100 sends data for storage and an identification or identifier (e.g., ID) associated with the data. The ID of the data may be part of a write command containing the data or may be an argument of a write command. Alternatively, the ID of the data may be sent, e.g., via a separate command, prior to a write command but is associated with the write command because the write command is provided subsequent to the ID of the data.

The ID of the data may be separate from the data and addresses of the data in that the ID may not be extracted from the data that is being stored nor extracted from the address(es) of the storage location(s) of the data. For example, the ID of the data may take the form of existing metadata tags in the eMMC or UFS standards. Specifically, the ID of the data may take the form of ContextIDs used in the eMMC standard or DataTAGs used in the UFS standard.

In step 504, storage module 120 receives the data and the ID of the data. As discussed with respect to step 502, this may happen with one command or multiple commands. For example, storage module 120 may first receive the ID of the data as part of one command. Then all subsequent data received as part of one or more write commands will be associated with that ID. As an alternative example, host 100 may send the ID of the data as part of the write command or an argument of the write command for the data. As yet another alternative example, storage module 120 may receive the data and store the data temporarily. Storage module 120 may then receive the ID of the data while is the data is being temporarily store in a temporary storage location.

In step 506, storage module 120 determines the ID of the data received in step 504. For example, control circuit 204 may extract the ID of the data from a write command associated with the data or read the most recently sent ID of the data from a register or some other storage location.

In step 508, storage module 120 determines which hardware resources to use to store the data based on the ID of the data. For example, storage controller 200 may use the ID of the data to select one or more of a specific memory chip, a specific channel, and/or a specific plane to use when programming the data to mass storage 202. In cases where storage module 120 contains one type of resource, storage controller 200 may just use that single resource by default. For example, if storage controller 120 has one channel, then that one channel may always be used by default.

In one example, the ID of the data maybe a reserved contextID that is reserved to indicate that the data being written to the storage module 120 will be accessed as one of the parallel data streams that storage module 120 supports. Specifically and further to this example, if chunk1 of data is marked with an ID of "01h" and chunk2 of data is marked with an ID of "02h", then storage module 120 may store chunk1 and chunk2 in such a manner that parallel read access to chunk1 and chunk2 is possible. As examples, storage module 120 may ensure that chunk1 is stored using a different channel than a channel used to store chunk2, that chunk1 is stored on a different memory chip than a memory chip used to store chunk2, or that chunk1 is stored in a different plane than a plane used to store chunk2. If parallel read access is possible, then command queuing of read commands to chunk1 and chunk2 may improve performance over sequential execution of the commands.

In some embodiments, host 100 may be aware of a number of possible parallel read accesses to implement the above example. Host 100 may learn this information by, for example, reading data from registers 212 as described above. Host 100 may set the ID of data according to any number of factors, such as an application associated with the data, a data type (e.g., video, images, email, database, etc.), hardware (e.g., sensors, camera, GPS, etc.) associated with the data, etc.

In another embodiment, instead of setting IDs for particular data, entire partitions or other logical units (LU) of storage module 120 may be assigned IDs. In this embodiment, storage module 120 may use the ID of the partition or LU to determine which hardware resources to use when storing data to that partition or LU.

Embodiments of the present disclosure include a storage device comprising means for receiving data to be stored in the storage device, such as for example data in line 216B and data terminal 216A. The storage device comprises a set of memories including at least one memory, wherein each of the memories in the set of memories includes a plurality of memory circuits for storing data and is divided into a set of portions, each set of portions including at least one portion. The storage device comprises a set of channels connecting the set of memories to means for controlling the storage device, wherein the set of channels includes at least one channel and each of the channels in the set of channels connects the means for controlling the storage device to at least one of the memories in the set of memories. The means for controlling the storage device may comprise, for example, storage controller 200. The means for receiving further receives an ID associated with the data to be stored in the storage device. The means for controlling selects, based at least in part on the ID associated with the data, at least one of (1) a memory area from the set of memories or (2) a channel from the set of channels and the means for controlling utilizes the at least one of the selected memory area or the selected channel to store the data.

Although a feature may appear to be described in connection with a particular embodiment, one skilled in the art would recognize that various features of the described embodiments may be combined. Moreover, aspects described in connection with an embodiment may stand alone.

What is claimed is:

1. A storage device comprising:
    at least one memory;
    at least one register storing a value indicating a number of parallel read access streams associated with the at least one memory; and
    a controller configured to:
        write data to the at least one memory based at least in part on a stream identifier, wherein the stream identifier is based at least in part on the value indicating the number of the parallel read access streams, wherein the stream identifier indicates a particular read access stream of the parallel read access streams, and wherein the stream identifier is different from a memory address associated with the at least one memory.

2. The storage device of claim 1, wherein the controller is further configured to write the data to the at least one memory based at least in part on a logical memory address received from a host device.

3. The storage device of claim 1, wherein the controller is further configured to receive the stream identifier from a host device prior to receiving the data from the host device.

4. The storage device of claim 1, further comprising at least one of:
    a plurality of individually selectable memory areas;
    a plurality of individually selectable memory chips; or
    a plurality of individually selectable memory channels.

5. The storage device of claim 4, wherein the controller is further configured to select, based at least in part on the stream identifier, at least one of:
    a memory area of the plurality of individually selectable memory areas;
    a memory chip of the plurality of individually selectable memory chips; or
    a channel of the plurality of individually selectable memory channels.

6. The storage device of claim 1, wherein the stream identifier is associated with a physical memory address.

7. The storage device of claim 1, wherein the at least one memory is one of NAND, eMMC, UFS, SD card, or SSD memory.

8. The storage device of claim 1, the at least one register further storing at least one of:
    an indication of a width of channels in a set of channels;
    an indication of a number of channels in the set of channels;
    an indication of a number of memory chips in a set of memories;

a number of memory chips per channel; or a number of planes implemented in an individual memory chip.

9. A method comprising:

receiving data to be written to a storage device configured to be coupled to a host device, wherein the storage device comprises:

at least one memory; and at least one register storing a value indicating a number of parallel read access streams associated with the at least one memory; and writing the data to the at least one memory based at least in part on a stream identifier, wherein the stream identifier is based at least in part on the value indicating the number of the parallel read access streams, wherein the stream identifier indicates a particular read access stream of the parallel read access streams, and wherein the stream identifier is different from a memory address associated with the at least one memory.

10. The method of claim 9, further comprising:

receiving a logical memory address from the host device; and writing the data to the at least one memory based at least in part on the logical memory address received from the host device.

11. The method of claim 9, further comprising receiving the stream identifier from the host device prior to receiving the data from the host device.

12. The method of claim 9, wherein the storage device further comprises at least one of:

a plurality of individually selectable memory areas;

a plurality of individually selectable memory chips; or a plurality of individually selectable memory channels.

13. The method of claim 12, further comprising selecting, based at least in part on the stream identifier, at least one of:

a memory area of the plurality of individually selectable memory areas;

a memory chip of the plurality of individually selectable memory chips; or a channel of the plurality of individually selectable memory channels.

14. The method of claim 9, wherein the stream identifier is associated with a physical memory address.

15. The method of claim 9, wherein the at least one memory is one of NAND, eMMC, UFS, SD card, or SSD memory.

16. The method of claim 9, the at least one register further storing at least one of:

an indication of a width of channels in a set of channels;

an indication of a number of channels in the set of channels;

an indication of a number of memory chips in a set of memories;

a number of memory chips per channel; or a number of planes implemented in an individual memory chip.

17. A host device comprising:

an interface configured to couple the host device to a storage device, wherein the storage device comprises:

at least one memory; and at least one register storing a value indicating a number of parallel read access streams associated with the at least one memory; and a host controller configured to:

detect the value indicating the number of the parallel read access streams associated with the at least one memory;

determine, based at least in part on the value indicating the number of the parallel read access streams associated with the at least one memory, a stream identifier to be associated with data, wherein the stream identifier indicates a particular read access stream of the parallel read access streams;

transmit, to the storage device, the stream identifier associated with the data;

transmit, to the storage device, the data; and transmit, to the storage device, at least one memory address associated with the data, wherein the data is stored in the at least one memory based at least in part on the at least one memory address and the stream identifier, and wherein the stream identifier is different from the at least one memory address associated with the at least one memory.

18. The host device of claim 17, wherein the host controller is further configured to detect the value indicating the number of the parallel read access streams by at least reading the value indicating the number of the parallel read access streams from the at least one register of the storage device.

19. The host device of claim 17, wherein the host controller is configured to detect the value indicating the number of the parallel read access streams by at least receiving the value indicating the number of the parallel read access streams from the storage device.

20. The host device of claim 17, wherein the host controller is configured to determine the stream identifier based in part on at least one of:

an application associated with the data;

a data type associated with the data; or one or more hardware devices associated with the data.

* * * * *